US008708121B2

(12) United States Patent
Caputo

(10) Patent No.: US 8,708,121 B2
(45) Date of Patent: Apr. 29, 2014

(54) ELECTRONICALLY ACTIVATED CLUTCH

(76) Inventor: Nick Caputo, Stuart, FL (US)

( * ) Notice: Subject to any disclaimer, the term of this patent is extended or adjusted under 35 U.S.C. 154(b) by 480 days.

(21) Appl. No.: 12/784,307

(22) Filed: May 20, 2010

(65) Prior Publication Data

US 2011/0284339 A1    Nov. 24, 2011

(51) Int. Cl.
*F16D 23/12*    (2006.01)

(52) U.S. Cl.
USPC .......... 192/83; 192/84.1; 192/99 S; 192/30 W; 340/453

(58) Field of Classification Search
USPC ........................................................ 192/83
See application file for complete search history.

(56) References Cited

U.S. PATENT DOCUMENTS

| 4,505,364 A | * | 3/1985 | Goucher et al. | ............. 192/3.58 |
| 5,413,200 A | | 5/1995 | Hirata | |
| 6,409,005 B1 | * | 6/2002 | Heston | ....................... 192/85.01 |

* cited by examiner

*Primary Examiner* — David D Le
*Assistant Examiner* — Ryan Dodd
(74) *Attorney, Agent, or Firm* — McHale & Slavin, P.A.

(57) ABSTRACT

The present invention employs an electronic control device which monitors and controls the extent of engagement of a friction clutch on a motor vehicle. The control device includes a variable controller which enables the operator of the motor vehicle to pre-select the extent or degree of engagement of the friction clutch. A switch enables the operator to activate the present invention and bypass the clutch lever which would normally be used to operate the friction clutch. A gauge indicates the degree of engagement of the friction clutch and a second switch enables the operator to disconnect the electronic control from operation of the clutch.

9 Claims, 6 Drawing Sheets

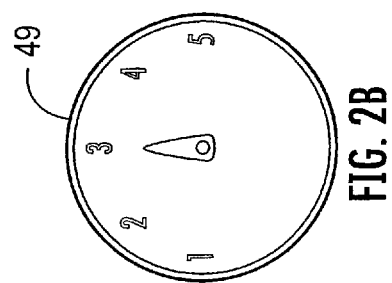
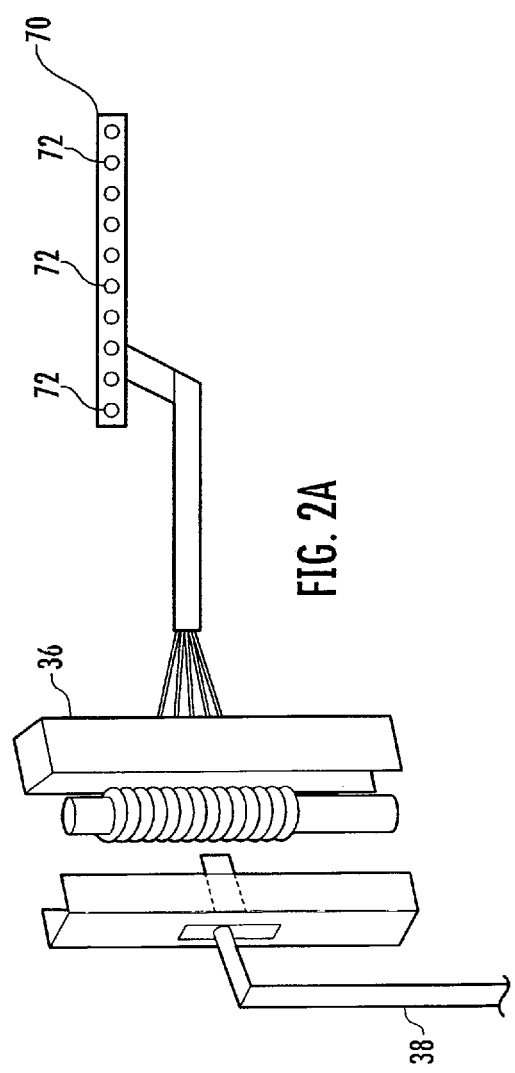

ELECTRONICALLY ACTIVATED CLUTCH

FIELD OF THE INVENTION

The present invention relates to an assist system for operating a vehicle clutch mechanism wherein the clutch mechanism can be normally activated by a clutch lever, or the assist system can selectively activate the clutch mechanism under different criteria.

BACKGROUND OF THE INVENTION

A vehicle, in particular a motorcycle, is provided with a clutch mechanism which operatively connects the output of an engine to a transmission. The clutch mechanism permits the transmission to be disengaged from the engine when the vehicle is not moving. The clutch mechanism also temporarily disengages the engine from the transmission when the transmission is shifted through the gears. Conventional clutch mechanisms provide an adequate device to transfer power from the engine to the transmission. However, the conventional clutch mechanisms do not allow the operator of the motorcycle, or other vehicle, to recognize the exact point at which the clutch is engaged or to "slip" the clutch to permit the vehicle to be moved at a very slow rate.

DESCRIPTION OF THE PRIOR ART

U.S. Pat. No. 5,413,200 discloses a power assist system for operation of a clutch mechanism on a motorcycle. When the motorcycle operator activates clutch lever 15, an on/off switch 58 is activated. The on/off switch controls operation of an electric motor. The electric motor moves a clutch cable 16 which engages and disengages the clutch. While this system does not require the same effort to operate a clutch that a conventional clutch lever requires, it is not a simple push button operation as the present invention is.

SUMMARY OF THE INVENTION

The present invention employs an electronic control device which controls the extent of engagement of a friction clutch on a motor vehicle. The control device includes a variable controller which enables the operator of the motor vehicle to pre-select the extent or degree of engagement of the friction clutch. A switch, preferably located on the handle bars of the motor vehicle, enables the operator to activate the present invention and bypass the clutch lever which would normally be used to operate the friction clutch. A gauge indicates the degree of engagement of the friction clutch, and a second switch enables the operator to disconnect the electronic control from operation of the clutch.

Accordingly, it is an objective of the instant invention to provide an electronic device which can be used in place of a clutch lever on a vehicle.

It is a further objective of the instant invention to provide an electronic device which controls the extent of engagement of a friction clutch on a motor vehicle.

It is yet another objective of the instant invention to provide an electronic device which enables the operator of a motor vehicle to pre-select the extent of engagement of a friction clutch on the motor vehicle.

It is a still further objective of the instant invention to provide an electronic device which partially engages the clutch of a motor vehicle and therefore enables the motor vehicle to "creep" along in traffic.

It is a still further objective of the invention to provide an electronic device which controls the extent of engagement of a friction clutch and further includes a switch to override the device.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 2A is a view of a first embodiment of a clutch engagement sensor of the present invention;

FIG. 2B is a view of a clutch position selector;

DETAILED DESCRIPTION OF THE INVENTION

Figure 1A:
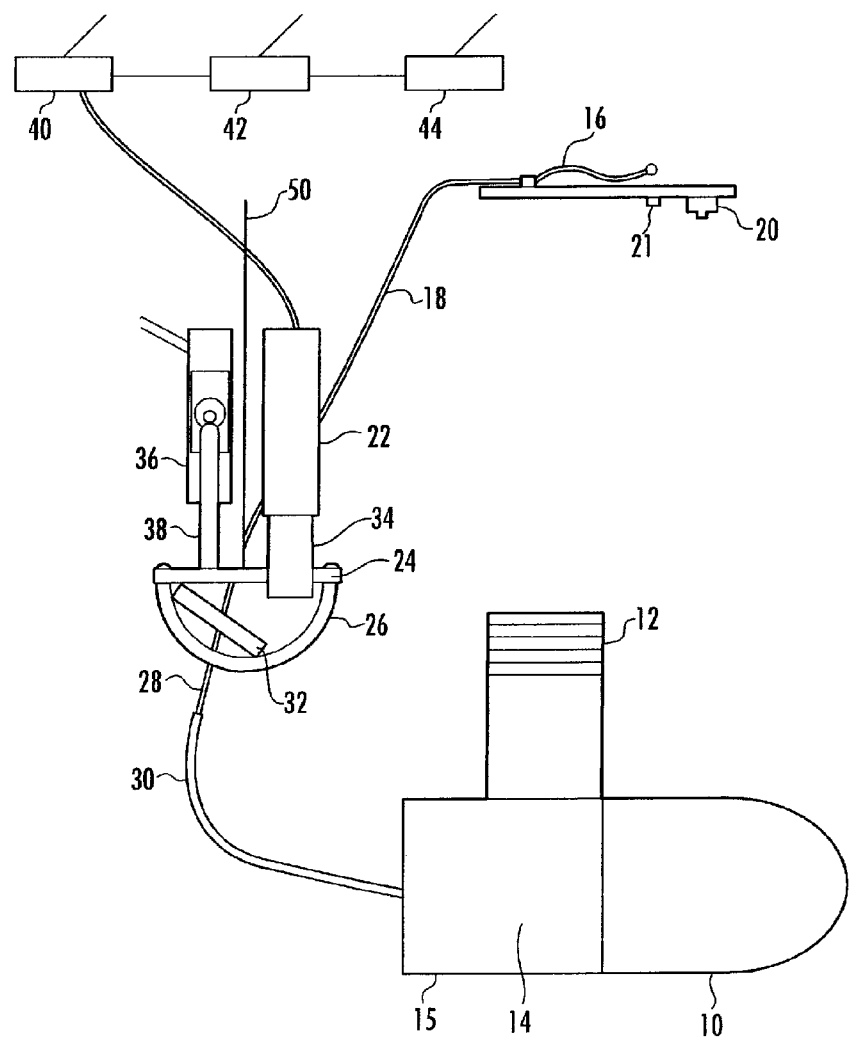
FIG. 1A is a schematic view of the present invention on a motor and transmission.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The present invention will now be described with reference to FIGS. 1-5. A transmission 10 is designed to deliver the power output from an engine 12 to the wheel or wheels, not shown, of a vehicle. A friction clutch 14 is operatively connected to the power output shaft of the engine 12. The friction clutch 14 is employed when the vehicle begins to move from a stopped position. The friction clutch enables the power output from the engine to be transferred to the transmission 10 and the wheels without stalling the engine. After the vehicle begins to move, the clutch is employed to enable the operator of the vehicle to shift up and down the gears in the transmission easily and without damage to the engine.

During the normal operation of the clutch, a lever 16 is activated by the operator of the vehicle. When the lever is pulled in or toward the operator, the cable 18 moves relative to the clutch housing 15. This movement disengages the clutch from the transmission 10. When the clutch is disengaged from the transmission, the transmission can be shifted up or down through the gears. Also, the clutch is disengaged when the vehicle is stopped and just prior to the vehicle beginning its forward motion. In addition, whenever the speed of the vehicle needs to be lowered below the idle speed of the engine, the clutch must be disengaged. This occurs most often when traveling in heavy stop and go traffic.

If the operator is not proficient in operating the clutch lever, the clutch will be engaged at the incorrect time and stall the engine. In addition, when the vehicle is in heavy stop and go traffic, the constant operation of the clutch can lead to fatigue of the operator's hand. This fatigue will result in incorrect operation of the clutch and stalling of the vehicle's engine. The present invention overcomes these problems by eliminating the need to use the clutch lever 16 to operate the clutch.

Figure 1B:
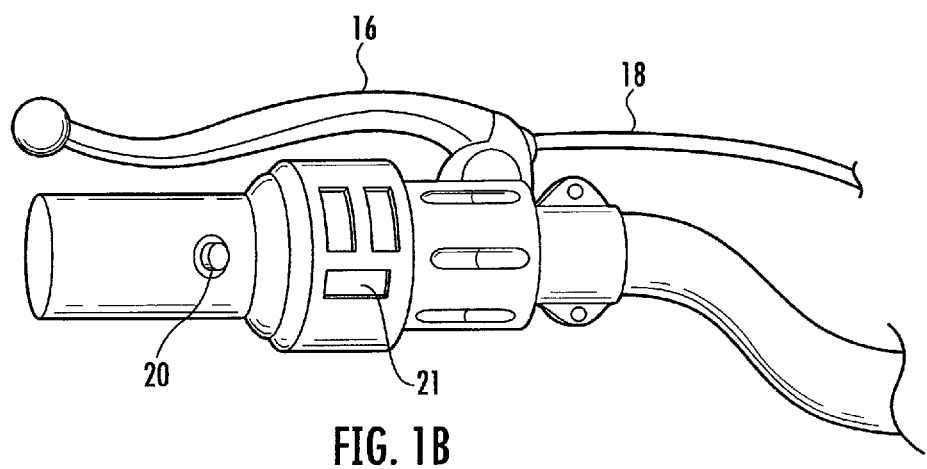
FIG. 1B is a view of a portion of a handlebar of a motor cycle incorporating the present invention.

The present invention utilizes a plurality of switches, buttons, servomechanisms and controls to operate the clutch of a vehicle in place of a mechanical lever. The controls can be preset to operate the clutch differently in different situations, such as slowly moving through traffic. These controls are illustrated in FIG. 1 and will be described in detail herein after.

In a preferred embodiment of the present invention, a button 20 is positioned on the handle bars of a vehicle, such as a motorcycle. The button 20 is electrically connected to an auxiliary actuator 22. A pin or small bar 24 is secured to one end of auxiliary actuator 22. The auxiliary actuator is preferably an electrically activated servomechanism. A wire loop 26 is secured between both ends of the pin or bar 24. The clutch cable 18 includes an inner wire 28 and an outer sheath 30. The outer sheath is secured to the clutch housing 15 and enables the inner wire 28 to move relative to the clutch housing. A stop 32 is secured to the inner wire 28 so that movement of the stop 32 will cause the inner wire 28 to also move.

When the operator desires to electrically operate the clutch, rather than use the clutch lever 16, he/she pushes the button 20 on the handle bar. This activates the auxiliary actuator 22 which retracts plunger 34 in an upward direction. Pin 24 and wire loop 26 are secured to plunger 34 so that whenever the plunger moves upwardly, the wire loop 26 will engage the stop 32 and move the clutch inner wire 28 to activate or disengage the clutch. A linear encoder 36 is located adjacent auxiliary actuator 22 on the vehicle. The linear encoder measures the distance that the clutch cable has traveled and translates the distance into an electrical signal. A rod 38 extends from the pin 24 to the linear encoder which enables the linear encoder to measure the distance that the clutch cable has moved or traveled. When the operator wishes to engage the clutch, he/she releases button 20. The actuator controls the degree of movement of the plunger 34 and thus the degree of engagement of the clutch.

A rotary control switch 49 (FIG. 2B) is electrically connected to the actuator 22. The operator of the vehicle determines the degree of engagement of the clutch by selecting one of the positions, 1-5, on the dial of the rotary control switch. When the system is activated the actuator 22 will move the clutch cable 18 the correct distance to engage the clutch the degree pre-set by the operator of the vehicle. Adjacent the button 20 on the handle bar is a resume button 21. This is a momentary contact button which interrupts the electric circuit which controls activator 22 and thus permits the clutch to be fully engaged. This is used once the motorcycle has attained its normal speed to move up and down through the gears.

Activation of switch 40 turns the system on or off. Activation of switch 42 turns on or off the "creeper" mode. Switch 42 has two positions, on and off. When switch 42 is set to "on" the "creeper" mode is on the clutch is not fully engaged which enable the motorcycle to move forward slowly. When the "creeper" mode is on the activator 22 does not allow plunger 34 to move downwardly completely, and thus the clutch is not completely engaged. When the operator activates the switch 20, the clutch will "slip" a predetermined amount based on which position rotary switch was set to. In other words, activation of the switch 40 allows activator 22 to permit plunger 34 to move downwardly a greater distance than before, thus further engaging the clutch. The distances that actuator moves downward are preset by the rotary switch 48. When the creeper mode is activated, by turning switch 42 to its on position, the motorcycle will move slowly on a level surface. This mode can be deactivated by turning switch 42 to its off position or by pushing the resume button 21. Switch 44 is another control which can also be used to turn the creeper mode on or off. When the clutch is further engaged the motor vehicle will move faster for a given revolution per minute (rpm) of the engine.

Figure 3:
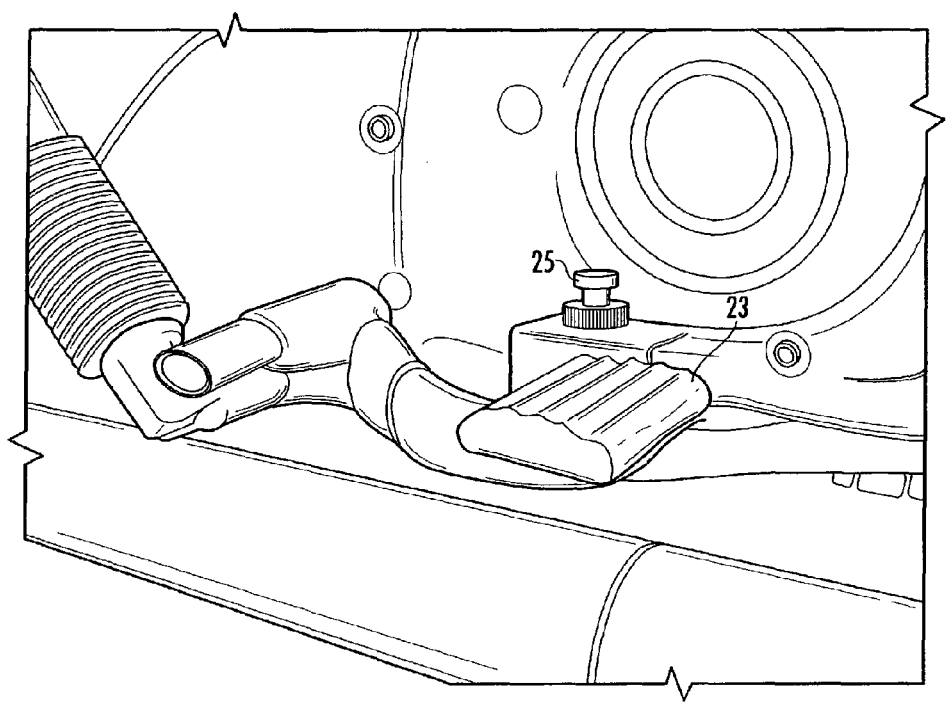
FIG. 3 is a side view of a motor and transmission including a brake pedal and control switch.
Figure 4:
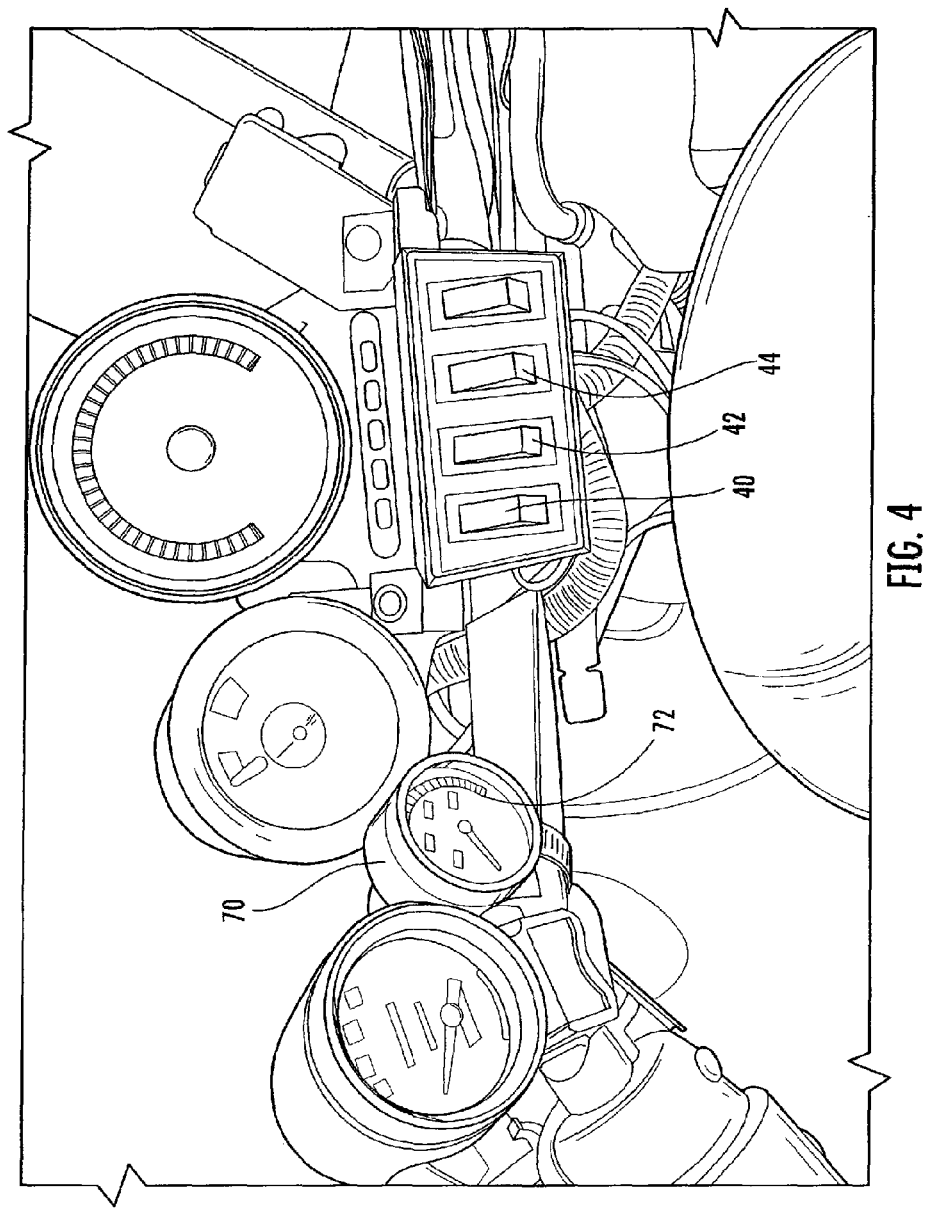
FIG. 4 is a view of the first embodiment of the control mechanism mounted on a motorcycle.

FIG. 3 illustrates a switch or button 25 which is mounted adjacent brake pedal 23. Button 25 performs the same function as button 20 and can be used alternatively in place of button 20. When the operator of the motorcycle is stopping the motorcycle he/she will apply the brake by activation of brake pedal 23. The operator can then activate switch 25 which turns on the system so the operator will not have to use clutch lever 16.

Figure 5:
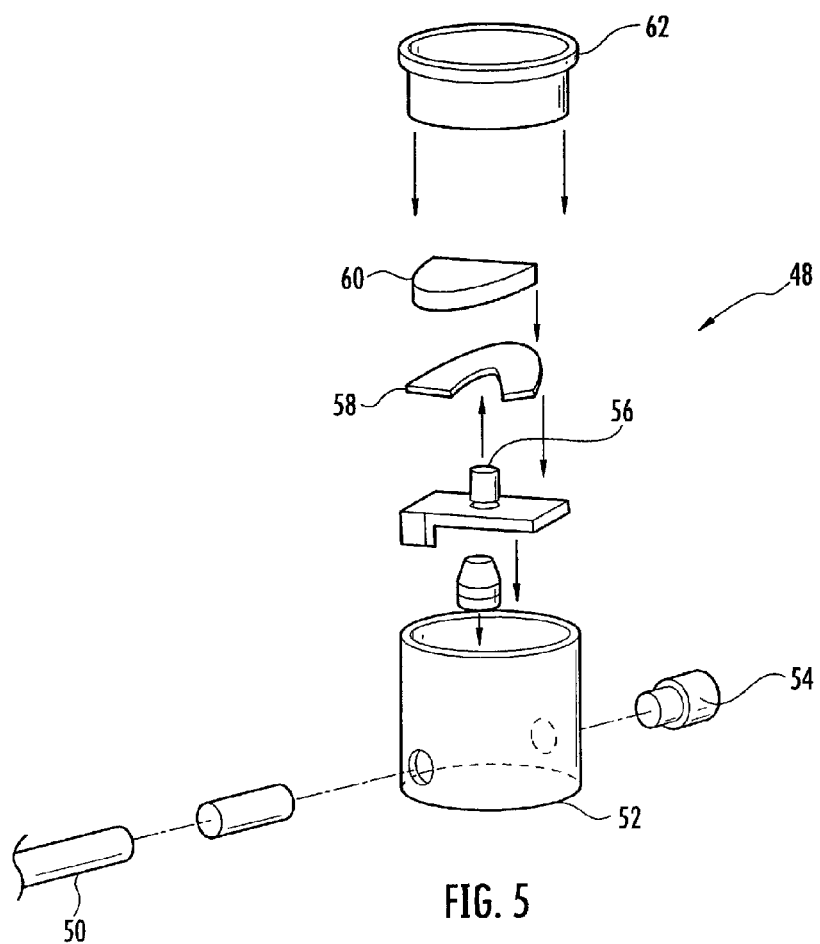
FIG. 5 is an exploded view of a second embodiment of the clutch engagement sensor.

Gauge 48, which indicates the point of engagement of the clutch, is illustrated in FIG. 5. Gauge 48 has a cable 50 secured to a lower portion. Cable 50 is connected to pin 24. The cable passes through a housing 52 and has an adjustment screw 54 attached to one end. Rotation of the adjustment screw 54 lengthens or shortens cable 50. The distance that pin 24 moves, which is related to the degrees of engagement of the clutch, is transferred via cable 50 to gauge 48. When the cable 50 moves within housing 52 it rotates indicator 56. Indicator 56 is located above a scale 58. The scale 58 includes colors such as green, yellow and red which indicate the degree of engagement of the clutch as described above. A baffle 60 is located above the scale 58. Finally, a clear cover 62 closes an upper end of the housing. By seeing where the clutch engages relative to where is should engage, the operator of the motorcycle can determines if the clutch needs to be adjusted.

Gauge 70 is electrically connected to encoder 36 (FIG. 2A). Gauge 70 also indicates the degree is engagement of the clutch. Rod 38 moved up and down dependent on the degree of engagement of the clutch. This movement is translated into electrical signals in encoder 26. These signals are sent to gauge 70. Gauge 70 includes a plurality of LEDs 72. These LEDs are red or yellow or green. Preferably there are 10 LEDs. The first three LEDs on the left side of gauge are red. The next four LEDs, toward the right side, are yellow. The last three LEDs on the right side of the gauge are green. When only the red LEDs are illuminated, this is an indication that the clutch is slipping completely and is not engaged. When some or all of the yellow LEDS are illuminated, this is an indication of partial engagement of the clutch. The degree of engagement is dependent on the number of yellow LEDS which are illuminated. When the green LEDS are illuminated, this indicates that the clutch is fully engaged. While 10 red, yellow and green LEDs are shown in the preferred embodiment, any number of LEDS and any other colored LEDs can be employed.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A control device for a clutch positioned between a prime mover and a transmission, said control device comprising:
    a clutch cable operatively connected between said clutch and an actuation lever;
    said actuation lever and said clutch cable being constructed and arranged to operatively engage and disengage said clutch upon activation by an operator of a motor vehicle;
    an auxiliary actuator, said auxiliary actuator operatively connected to said clutch cable, said auxiliary actuator constructed and arranged to operatively engage and disengage said clutch independently of operation of said actuation lever;
    an encoder, said encoder constructed and arranged to electrically monitor the movement distance of said clutch cable,
    a control switch operatively connected to said auxiliary actuator, said control switch constructed and arranged to control operation of said auxiliary actuator, to provide a predetermined degree of engagement of said clutch;
    an indicator device, said indicator device displaying the degree of engagement of said clutch, said indicator device in electrical communication with said encoder to monitor movement of said clutch cable;
    whereby said operator of said motor vehicle can determine the degree of engagement of said clutch.

2. The control device of claim 1 wherein said auxiliary actuator is an electrically activated servomechanism, said servomechanism is mounted on a frame of a vehicle.

3. The control device of claim 2 wherein said servomechanism is deactivated by a first switch being positioned on a handle bar of said vehicle.

4. The control device of claim 2 wherein said servomechanism is activated by a second switch positioned adjacent a brake pedal of a vehicle.

5. The control device of claim 2 including a third switch, said third switch activating the servomechanism to partially engage the clutch thereby permitting a vehicle to move slowly forward.

6. The control device of claim 1 wherein said indicator device includes a plurality of lights, said plurality of lights being constructed and arranged to illuminate dependent on the degree of engagement of said clutch.

7. The control device of claim 6 wherein said plurality of lights include differently colored lights, said differently colored lights are illuminated dependent on the degree of engagement of said clutch.

8. The control device of claim 1 wherein a control mechanism is secured to a cable, said cable is mechanically adjustable to control the degree of engagement of said clutch.

9. The control device of claim 3 including a fourth switch, said fourth switch being positioned adjacent a brake pedal of a vehicle, said fourth switch performing the same function as said first switch.

* * * * *